United States Patent [19]
Bottrill

[11] Patent Number: 5,835,369
[45] Date of Patent: Nov. 10, 1998

[54] POWER FACTOR AND CREST FACTOR CIRCUIT

[75] Inventor: John Bottrill, Ashton, Canada

[73] Assignee: Northern Telecom Limited, Montreal, Canada

[21] Appl. No.: 893,543

[22] Filed: Jul. 8, 1997

[51] Int. Cl.[6] ................................................. H02M 7/06
[52] U.S. Cl. ............................................. 363/126; 363/17
[58] Field of Search .............................. 363/17, 98, 125, 363/126, 132

[56] References Cited

U.S. PATENT DOCUMENTS

| | | | |
|---|---|---|---|
| 3,737,755 | 6/1973 | Calkin et al. | 363/17 |
| 4,275,436 | 6/1981 | Peterson | 363/126 |
| 4,672,522 | 6/1987 | Lesea | 363/126 |
| 5,172,308 | 12/1992 | Tohya | 363/17 |
| 5,351,179 | 9/1994 | Tsai et al. | 363/126 |
| 5,576,940 | 11/1996 | Steigerwald et al. | 363/17 |

*Primary Examiner*—Stuart N. Hecker
*Attorney, Agent, or Firm*—Aprilia U. Diaconescu

[57] ABSTRACT

A power factor and crest factor correction circuit for a power distribution network of the type comprising a low power source for supplying a plurality of ports with an ac signal is disclosed. Each port comprises a rectifier bridge, a bulk storage capacitor and a power converter connected across the rectifier bridge, The power factor and crest factor correction circuit comprises an inductor, series connected between the rectifier bridge and the bulk capacitor, for reducing the current peaks in a rectified signal received from the rectifier bridge. The correction circuit also comprises diode means connected in parallel across the inductor for discharging the bulk capacitor whenever the voltage across the bulk capacitor exceeds the voltage of the rectified signal. As a result, a higher power factor is obtained for the dc signal applied to the power converter, and also the current peaks in the dc signal are substantially reduced.

8 Claims, 7 Drawing Sheets

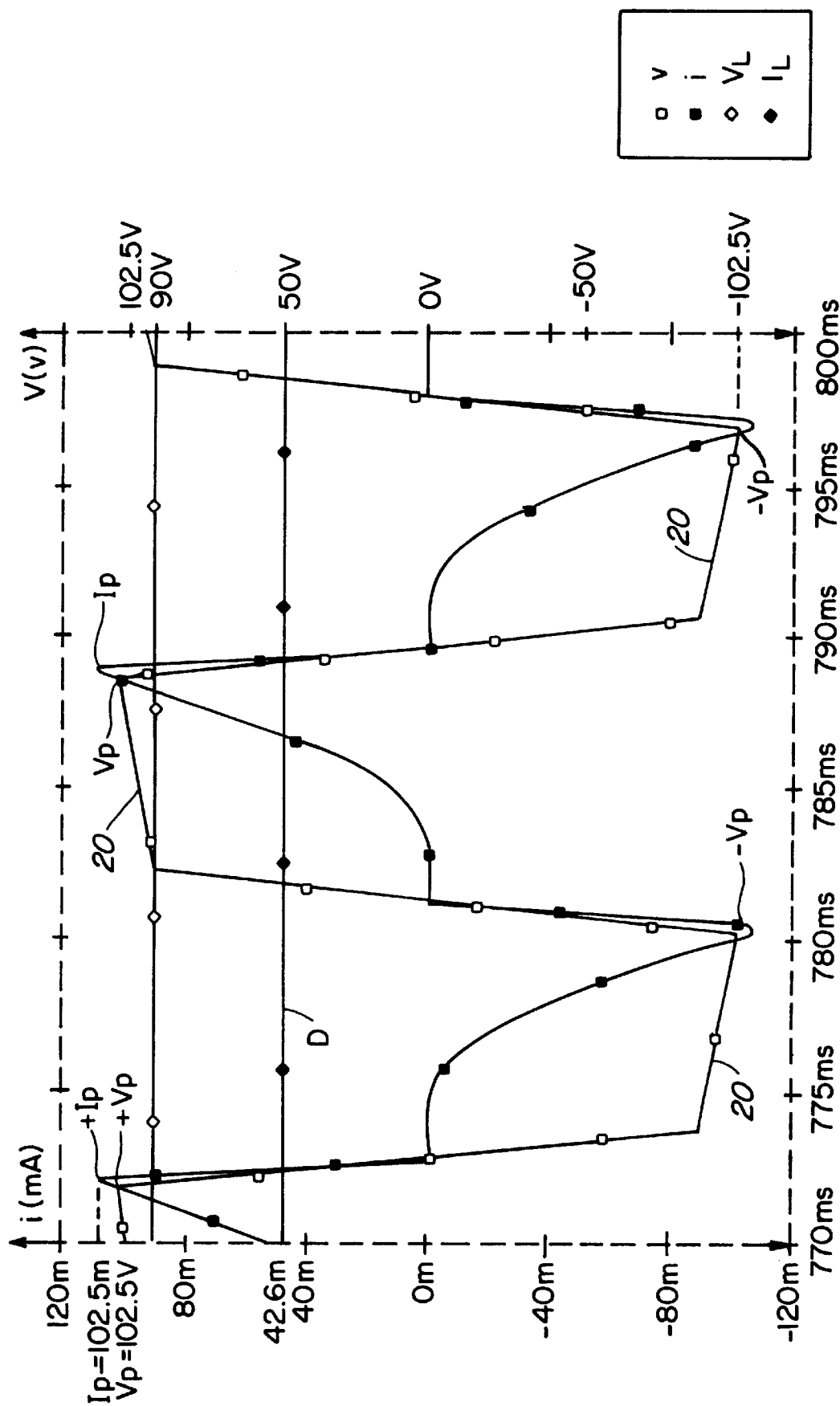
FIG. 2B ((PRIOR ART))

POWER FACTOR AND CREST FACTOR CIRCUIT

BACKGROUND OF THE INVENTION

1 Field of the Invention

The invention is directed to power factor correction circuits for low power ac distribution networks, and more specifically to a power factor/crest factor correction circuit.

2 Background Art

Generally, the voice port circuits and other cable TV systems are operated off an unsophisticated square or trapezoidal wave 50 or 60 nominal source. This wave has a slope on the flat portion that results in the voice port current peaking at the end of the flat portion, resulting in high current transients (or crest factor), larger volt drops on the power line, and lower power factors. The poor power factor and the crest factor of the current result also in distribution limitations and problems with the source equipment.

The current spikes may be corrected using an inductor before the voice port system. However, such a solution results in an unacceptably large voltage drop in the input voltage at the equipment, which reduces the distribution range of the system. Therefore, this solution is not practical.

The use of an inductor after the input bridge is the most popular approach to reducing the current spikes. The power factor increases in this case and the peak currents drop considerably. While a significant improvement is obtained compared to the above approach, this solution also results in an unacceptable drop in the voltage on the bulk storage capacitor. This voltage drop becomes more important at the end of a long loop, when the line voltage is down and the unit is near the point where it will shut off because of low voltage.

Still another solution is to use a standard power factor correction circuit. However, this solution implies costs for re-designing the voice port and also additional costs for the components (currently $12.00US). Furthermore, power factor correction circuits are not traditionally used on units that have power requirements under 75 watts.

As each of the voice port systems is extremely cost sensitive and only uses about 3 to 8 watts itself in the idle mode, it is desirable to find a method to correct the power factor that is inexpensive and efficient.

SUMMARY OF THE INVENTION

It is an object of this invention to provide an improved power factor and crest factor correction circuit which reduces or solves all or part of the drawbacks of the prior art circuits.

It is another object of the invention to provide a power factor and crest factor circuit for supplying the voice port or other cable TV systems with a current and voltage substantially in phase, and with reduced high current peaks.

Accordingly, a power distribution network of the type comprising a low power source for supplying a plurality of ports with an ac signal, each port comprising a rectifier bridge, a bulk storage capacitor and a power converter connected across the rectifier bridge, a power factor and crest factor correction circuit comprising an inductor, series connected between the rectifier bridge and the bulk capacitor, for reducing the current peaks in a rectified signal received from the rectifier bridge, and diode means connected in parallel across the inductor for discharging the bulk capacitor whenever the voltage across the bulk capacitor exceeds the voltage of the rectified signal.

Further, a power supply circuit for supplying a port of a power distribution network with an ac signal, comprising a rectifier bridge provided with a bulk storage capacitor connected across the rectifier bridge, for rectifying the ac signal to provide a dc signal across the bulk capacitor, a power converter connected across the bulk capacitor for receiving the dc signal and converting same to a supply signal for the port, an inductor, series connected between the rectifier bridge and the bulk capacitor, for reducing the current peaks in a rectified signal received from the rectifier bridge, and diode means connected in parallel across the inductor for discharging the bulk capacitor whenever the voltage across the bulk capacitor exceeds the voltage of the rectified signal.

According to the invention, an inductor is connected between the rectifying diodes and the bulk storage capacitor, and a diode, or series of diodes, is/are installed in parallel with the inductor but reverse to the direction of the dc current flow through the inductor.

Advantageously, the power resources of the loop are better employed with the solution according to the invention, because the current and voltage are substantially in phase, resulting in a power factor with higher values than obtained with the prior art solutions. In addition, because the loss due to the line resistance is reduced when the peak currents are reduced, the line volt drop is minimized. As a result, the loop length can be extended.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2B shows the time diagrams for currents and voltages in the circuit of FIG. 2A, for a high supply voltage;

DESCRIPTION OF THE PREFERRED EMBODIMENT

Figure 1A:
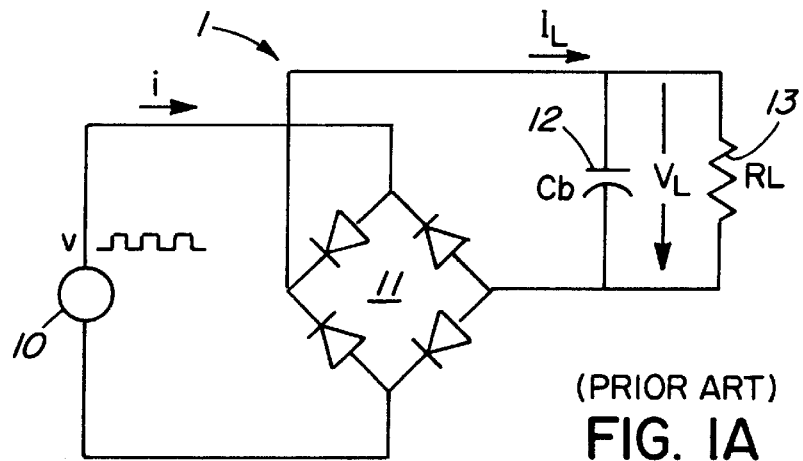
FIG. 1A shows a schematic of a conventional power supply circuit for a voice port.
Figure 1B:
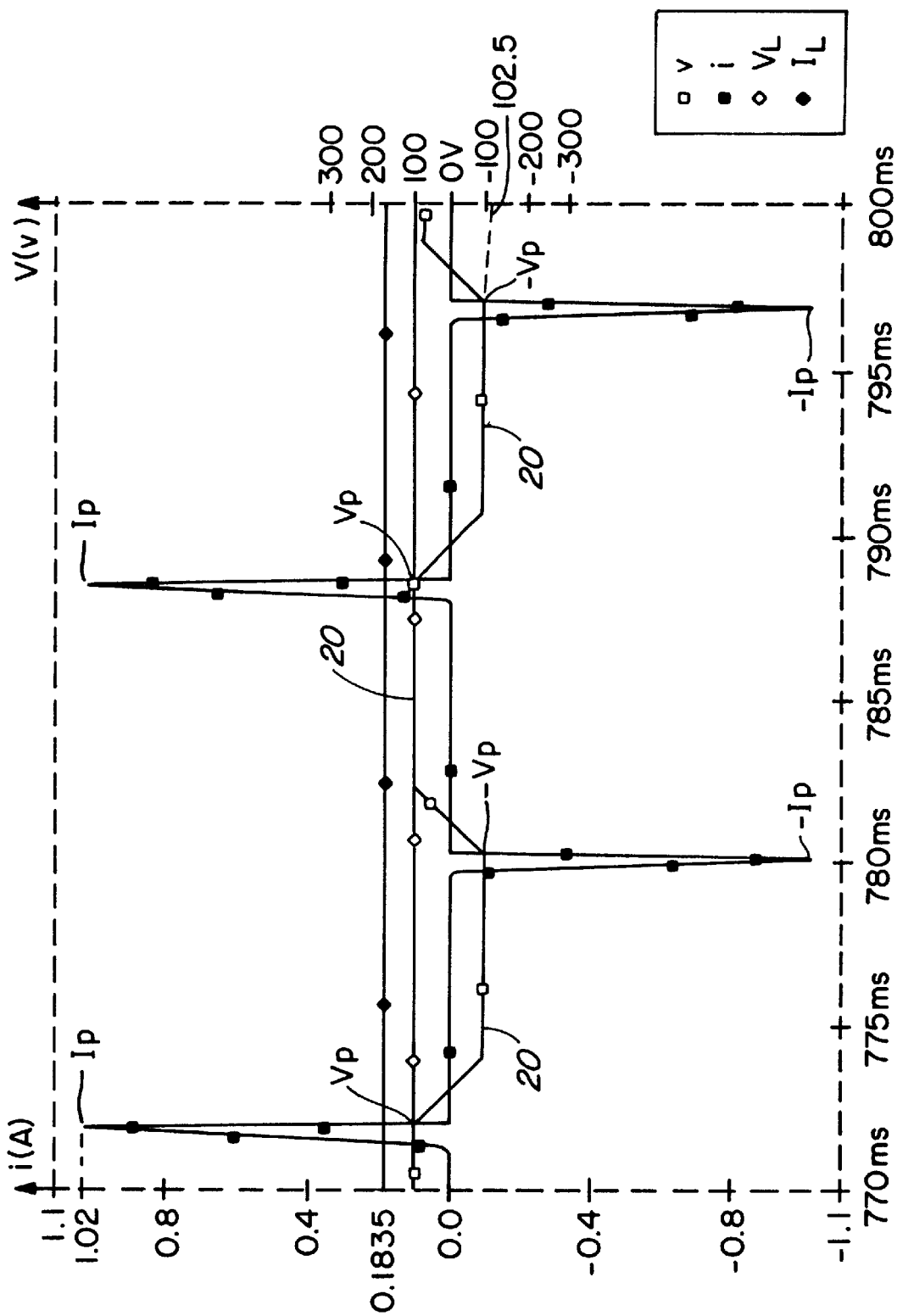
FIG. 1B shows the time diagrams for currents and voltages in the circuit of Figure 1A, for a high supply voltage.
Figure 1C:
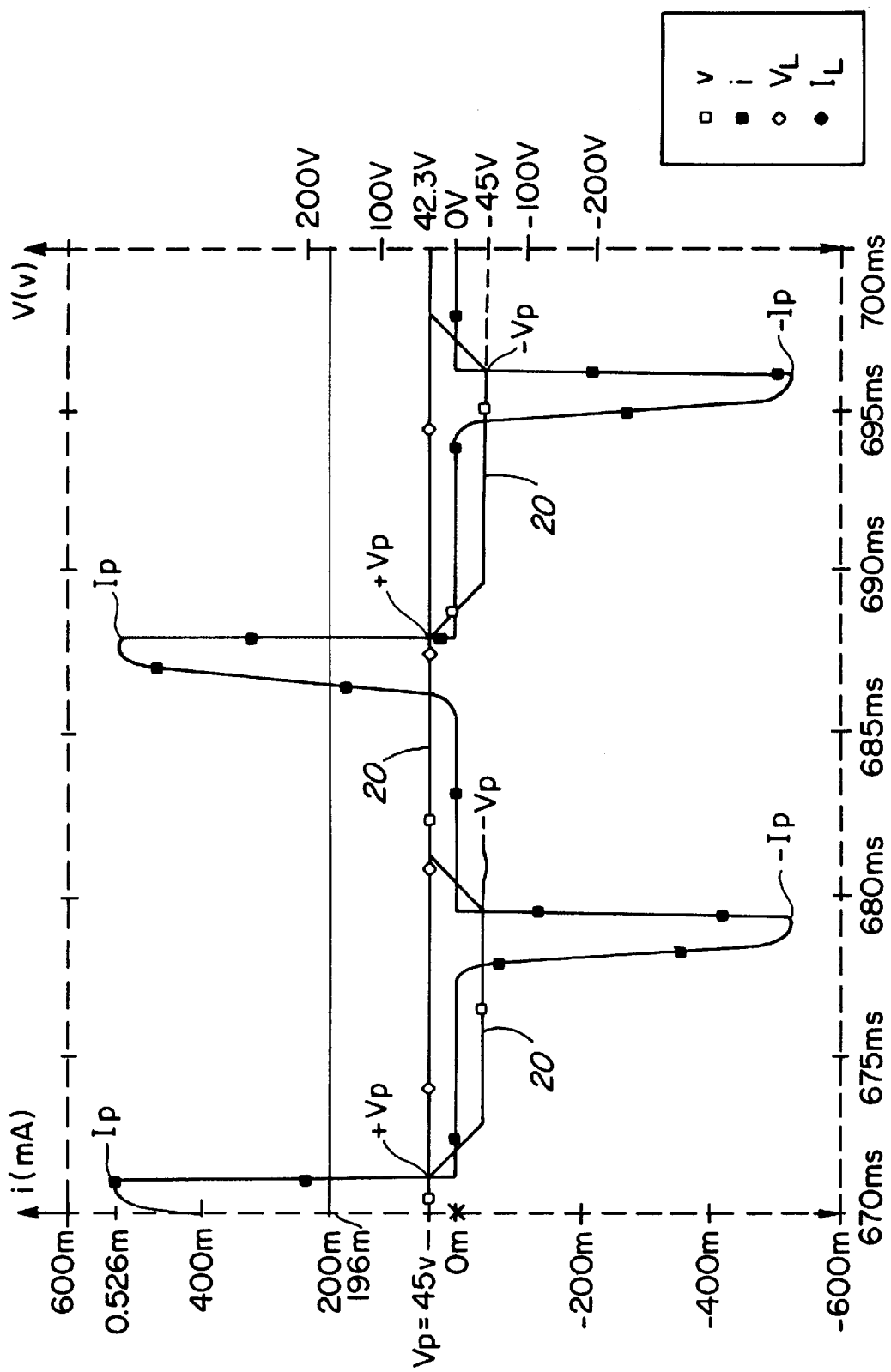
FIG. 1C shows the time diagram for currents and voltages in the circuit of FIG. 1A, for a low supply voltage.

FIGS. 1A–1C illustrate the schematic of a conventional power supply circuit 1 for a voice port and the respective time diagrams for the current and voltage. Here, a generator 10 applies a square wave of 50–60 Hz to input of a rectifying diode bridge 11. It is to be understood that the invention can be used also for sinusoidal voltage applications, which are not described here.

The output of the bridge is connected to a bulk storage capacitor 12. The value $C_b$ of this capacitor is as large as possible for obtaining a substantially constant voltage across load 13. The value of $C_b$ is in the order hundreds of $\mu F$ (for example 560 μF for the voice port card #MTBN6201 manufactured by NORTEL). Load 13 is a pulse width modulated power converter represented by a resistance for illustration purposes, and is designated by $R_L$ in the Figures.

The time diagrams for the current and voltage in circuit 1 are shown in FIGS. 1B and 1C. In these Figures, as in all time diagrams provided in this disclosure, graph "v" shows the voltage at the input of bridge 11, graph "i" shows the corresponding line current, graph "$V_L$" illustrates the output voltage across the bulk storage capacitor 12, and graph "$I_L$", the RMS (root mean square) current in the output circuit of bridge 11.

As indicated above, the square wave generated by generator 10 has a slope on the flat portion that results in the current into the voice port peaking at the end of the flat portion. This undesired current peaks result in higher current harmonics, larger voltage drops on the power line and lower power factors.

FIG. 1B shows the input and output currents and voltages for circuit 1, for a high input voltage. In this example, the flat portion of v are at approximately ±100V, each pulse presenting a voltage peak at ±102.5V at the end of the flat portion 20. The current peak corresponding to this voltage peak is at 1.02A. At the output of bridge 11, the voltage applied to the load $V_L$ is 100V, and the RMS current $I_L$ is 183.5 mA. The power factor calculated for the circuit 1 is a low 23%.

FIG. 1C illustrates the input and output currents and voltages for circuit 1, for a low input voltage, which is in this example 40V. The voltage peak $V_p$ is at 45V at the end of each flat portion 20, and the current peak $I_p$, corresponding to $V_p$, is at 0.526A. The resulting output voltage $V_L$ is 42.3V and $I_L$ is 196 mA. The power factor calculated for the circuit 1 is for this case is 45%, which is higher than that for high input voltage.

Figure 2A:
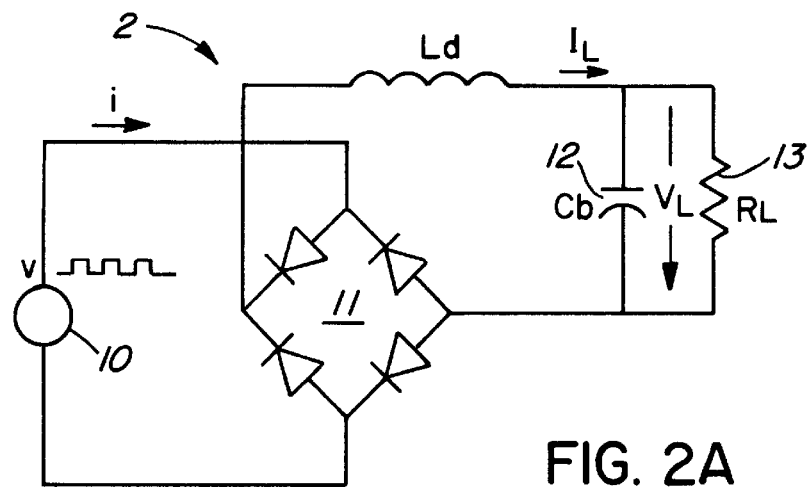
FIG. 2A shows a schematic of another conventional power supply circuit for a voice port.
Figure 2C:
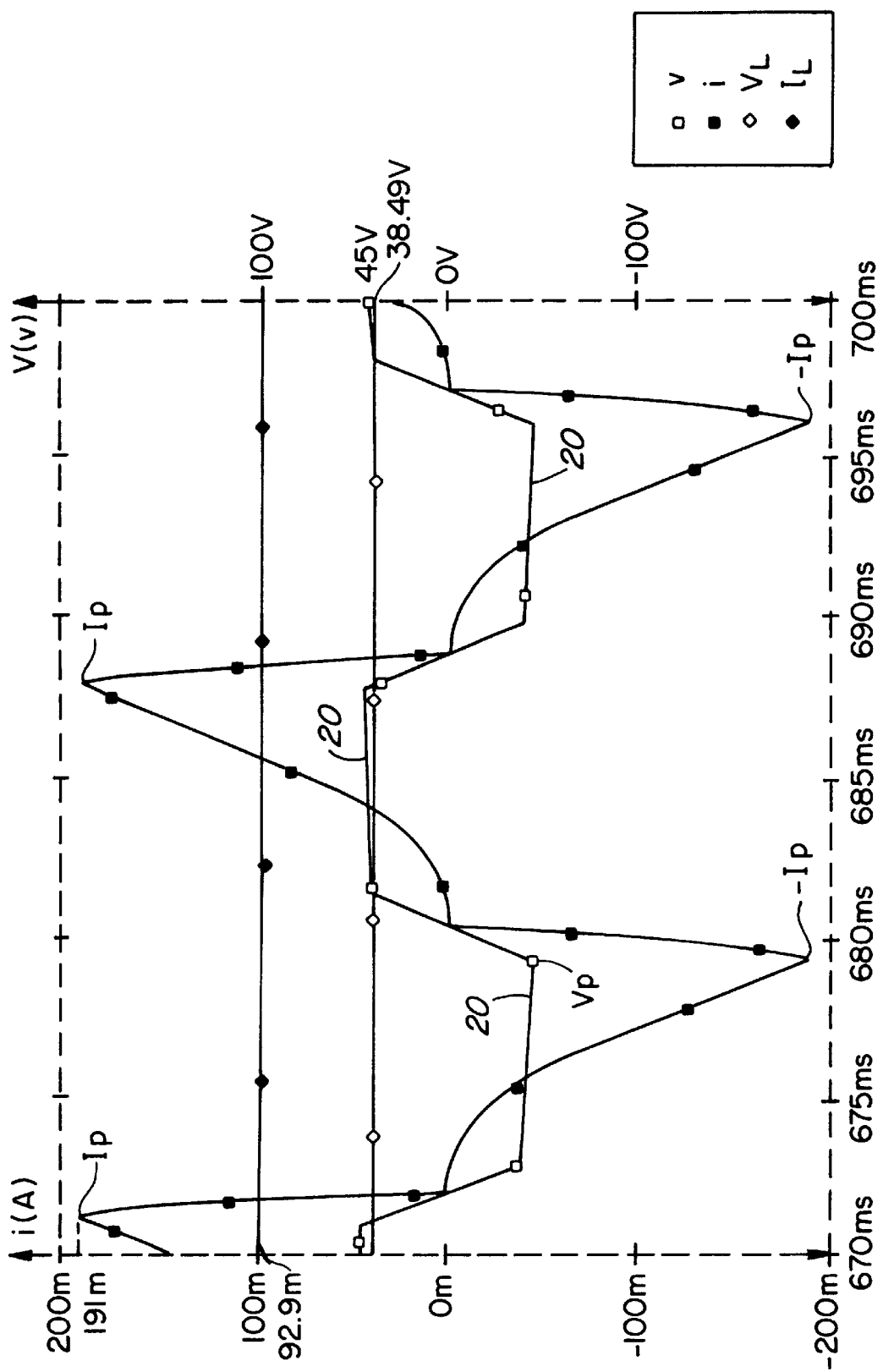
FIG. 2C shows the time diagram for currents and voltages in the circuit of FIG. 2A, for a low supply voltage.

FIGS. 2A–2C show another conventional solution. An inductor 14 has been connected after bridge 11, as shown in FIG. 2A, for reducing the current peaks. A value of 100 mH was selected in the example of FIGS. 2B and 2C for the inductor.

For the case of high voltage v, illustrated in FIG. 2B, the current peaks $I_p$ are at 102.5 mA, which is 10 times less than the previous value of 1.02A. While a higher power factor 58% was obtained for circuit 2, it is clear from graph $V_L$ that the output voltage dropped from 100V to 90V, and the RMS current $I_L$ dropped from 183 mA to 42.6 mA, with the ensuing disadvantages discussed above.

A similar drop in output voltage and current is obtained for a low input voltage v, as shown in FIG. 2C. While the current peaks decreased to 191 mA, and the power factor increased to 72%, the output voltage $V_L$ is now 38,49V, less by approximately 3.8V than in the solution of FIG. 1A. The RMS current is 92.9 mA, again, less by 103.1 mA than the corresponding value obtained with circuit 1.

It is apparent from the FIGS. 1B, 1C, 2B and 2C that the peak currents result in important voltage drops. If the high peak currents are reduced, the losses due to the line resistance are reduced accordingly, and the loop length can be extended because the line voltage drop is minimized. It is also apparent from these time diagrams that the current and voltage are not in phase. If the current is in phase perfectly with the voltage, the power factor by definition is 100.

Figure 3A:
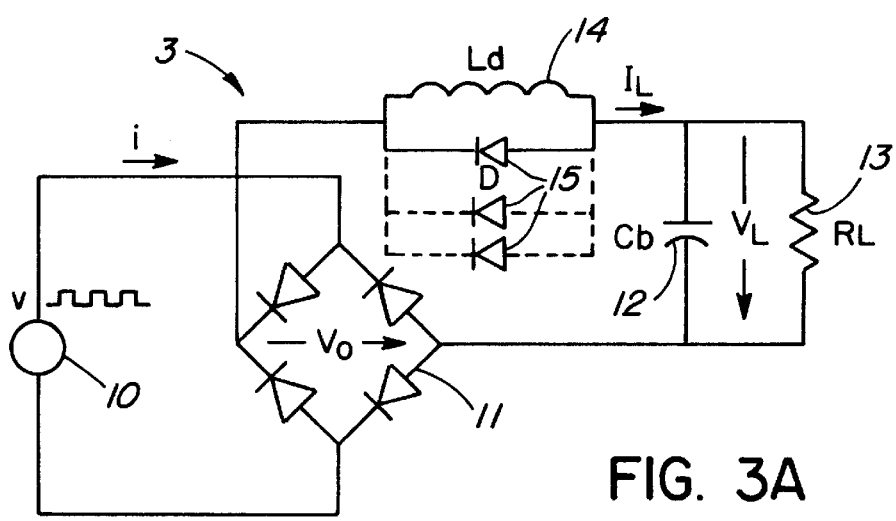
FIG. 3A illustrates the schematic of the power supply circuit according to the invention.

FIG. 3A illustrates a circuit 3 according to the present invention. This circuit was designed to have the current in phase as much as possible with the voltage and to further reduce the current peaks. These goals are achieved by connecting inductor 14 in the output circuit of bridge 11 and connecting a diode 16 in parallel with inductor 14.

In general, the voltage drop over a diode, as diode 16 in circuit 3, is approximately 0.7V. When voltage $V_O$ at the output of bridge 11 drops 0.7V below the voltage $V_L$ on bulk capacitor 12, capacitor $C_b$ discharges through diode D. When the voltage increases on the next half cycle to within 0.7V of the voltage $V_L$ on capacitor $C_b$, the current stops flowing through the diode and starts to recharge $C_b$. Conduction continues until the voltage $V_O$ drops below that on $C_b$ by more than the drop over D.

If inductor 14 were infinitely large, the current "i" would be approaching the square wave shape of voltage "v", which would lead to a power factor of 100%.

In practice, two series connected diodes were used instead of D, for circuit 3, and the value of $L_d$ was selected 100 mH. Provision of two diodes instead of one diode 15 of one results in a higher conduction angle, resulting in a better power factor, and lower peak currents for a slight voltage drop on the bulk capacitor. The value of 100 mH selected for $L_d$ ensures that the current remains relatively flat over the conduction time.

Figure 3B:
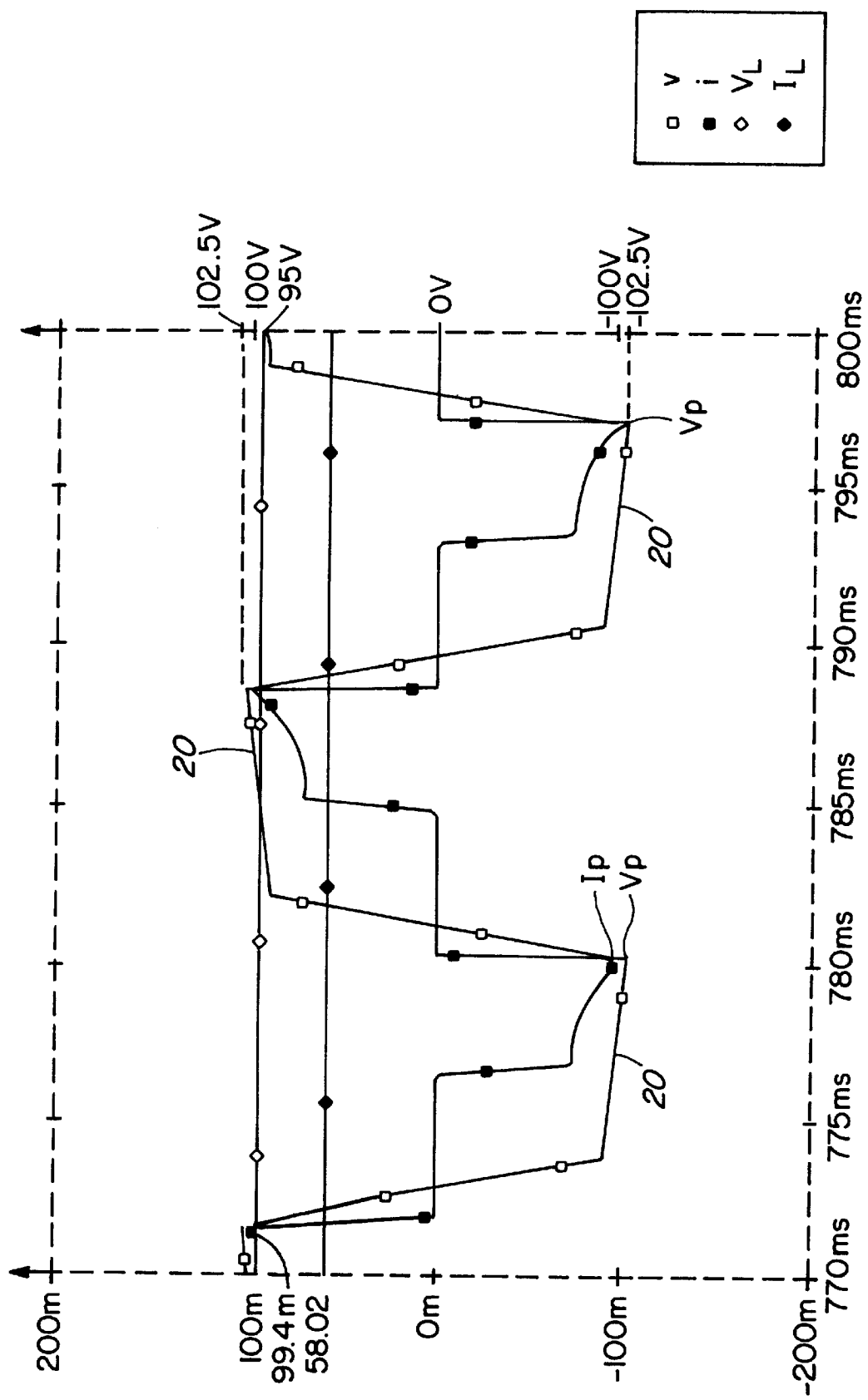
FIG. 3B shows the time diagrams for currents and voltages in the circuit of FIG. 3A, for a high supply voltage.

FIG. 3B shows the case of a high voltage "v", with peaks at $V_p$=±102.5V, conducting to current peaks $I_p$ at 99.4 mA, which are lower than in the corresponding cases illustrated in FIGS. 1B (1.02A) and 2B (102.5 mA). Output voltage is 95.8V, and the RMS current $I_L$ is 58.02 mA, both being higher than those obtained with the inductor only solution of circuit 2. In addition, a higher power factor of 66% was obtained for circuit 3, operating at high voltages.

Figure 3C:
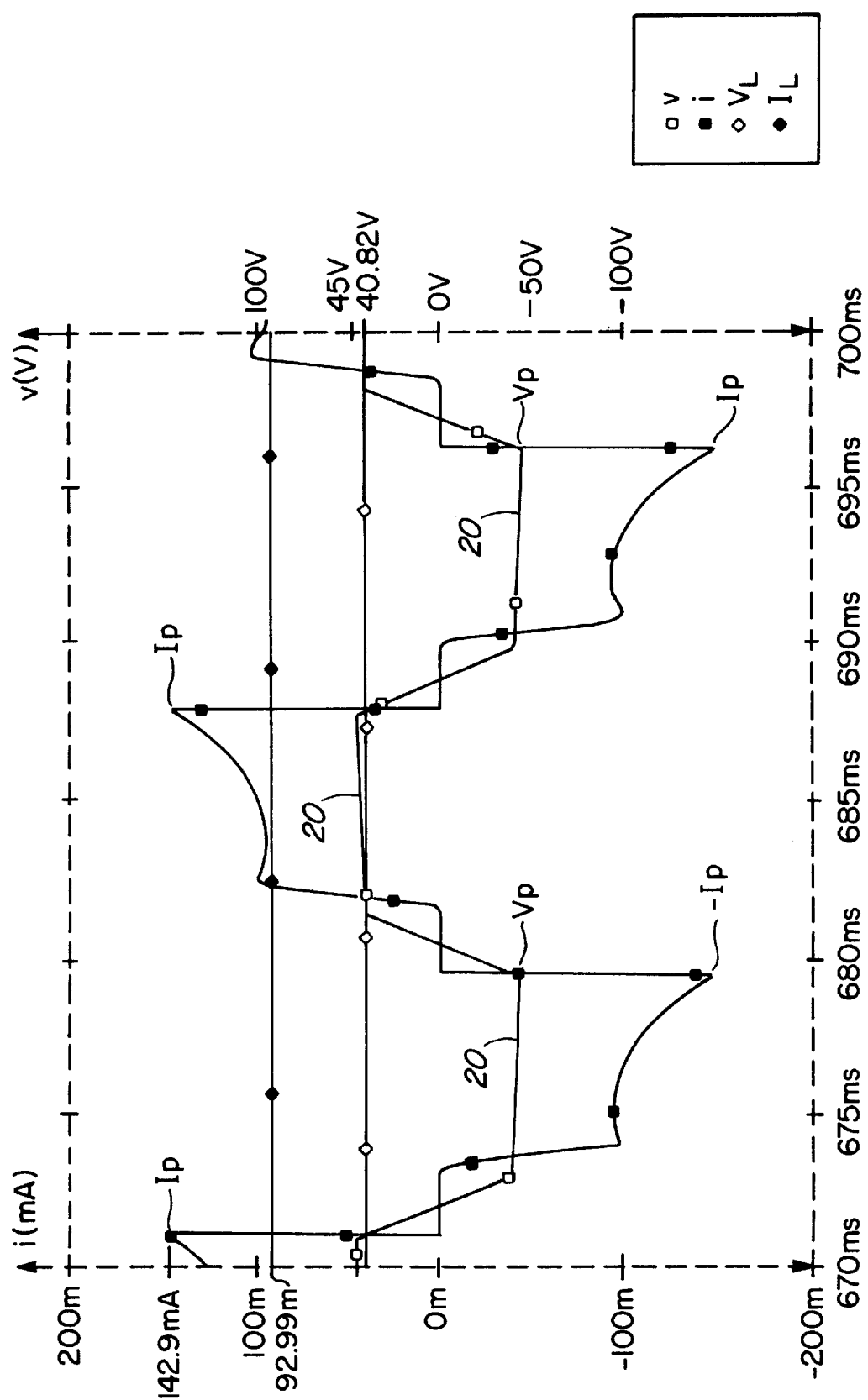
FIG. 3C shows the time diagram for currents and voltages in the circuit of FIG. 3A, for a low supply voltage.

The improvements are even more significant under low voltage conditions, shown in FIG. 3C. Here, the power factor increases from 72% for circuit 2 having the 100mH inductor only, to 85% with an 100 mH inductor, and two series diodes in parallel with the inductor. The peak current is $I_p$=142.9 mA, the output current is $I_L$=92.99 mA and the output voltage is $V_L$=40.82V. This represents a reduction in voltage of 3.5% from the result obtained with circuit 1 and an increase of 6% from the result obtained with circuit 2.

The additional cost for $L_d$-D parallel circuit is currently in the order of $1.50 compared to $12.00 for a full correction circuit. The power lost due to the added components is comparable to the power lost in a full correction circuit, while the board area occupied by this circuit is smaller than the area occupied by a full correction circuit.

While the invention has been described with reference to particular example embodiments, further modifications and improvements which will occur to those skilled in the art, may be made within the purview of the appended claims, without departing from the scope of the invention in its broader aspect.

What is claimed is:

1. In a power distribution network of the type comprising a low power source for supplying a plurality of ports with an ac signal, each port comprising a rectifier bridge, a bulk storage capacitor and a power converter connected across the rectifier bridge, a power factor and crest factor correction circuit comprising:
    an inductor, series connected between the rectifier bridge and the bulk capacitor, for reducing the current peaks in a rectified signal received from the rectifier bridge; and
    diode means connected in parallel across said inductor for discharging the bulk capacitor whenever the voltage across the bulk capacitor exceeds the voltage of said rectified signal.

2. A power factor and crest factor correction circuit as claimed in claim 1, wherein said diode means comprises a diode.

3. A power factor and crest factor correction circuit as claimed in claim 2, wherein said diode is connected with the anode to the positive pole of the bulk capacitor and with the cathode to the positive output of the bridge.

4. A power factor and crest factor correction circuit as claimed in claim 1, wherein said diode means comprises a plurality of diodes.

5. A power factor and crest factor correction circuit as claimed in claim 1, wherein said ac signal is a square wave.

6. A power factor and crest factor correction circuit as claimed in claim 1, wherein said ac signal is a trapezoidal wave.

7. A power factor and crest factor correction circuit as claimed in claim 1, wherein the said inductance of said inductor is in the range of 100 mH when the capacitance of the bulk capacitor is in the range of 500 $\mu$F.

8. A power supply circuit for supplying a port of a power distribution network with an ac signal, comprising:

a rectifier bridge provided with a bulk storage capacitor connected across said rectifier bridge, for rectifying said ac signal to provide a dc signal across said bulk capacitor;

a power converter connected across said bulk capacitor for receiving said dc signal and converting same to a supply signal for said port;

an inductor, series connected between said rectifier bridge and said bulk capacitor, for reducing the current peaks in a rectified signal received from the rectifier bridge; and diode means connected in parallel across said inductor for discharging the bulk capacitor whenever the voltage across the bulk capacitor exceeds the voltage of said rectified signal.

* * * * *